Patented Jan. 30, 1923.

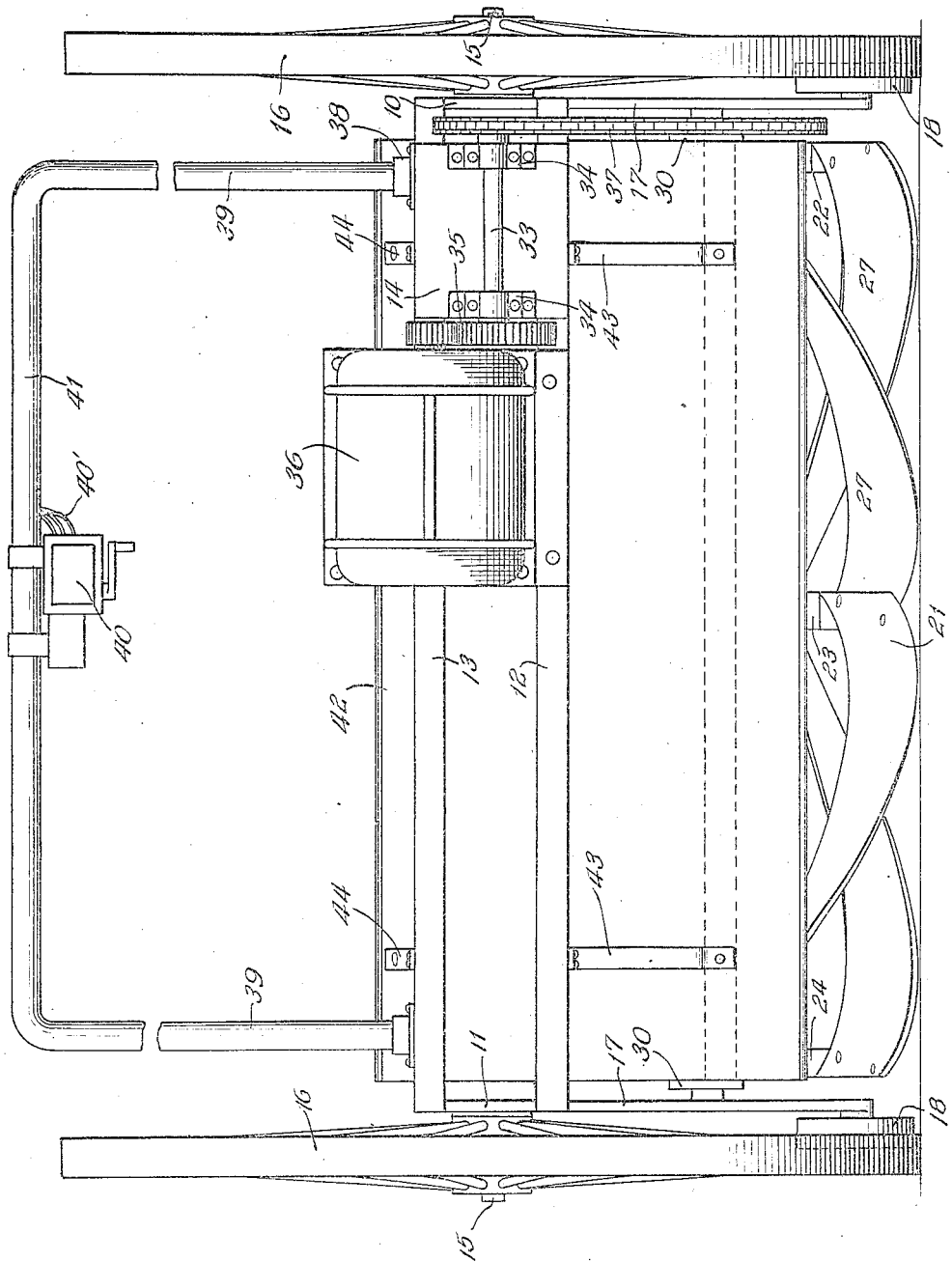

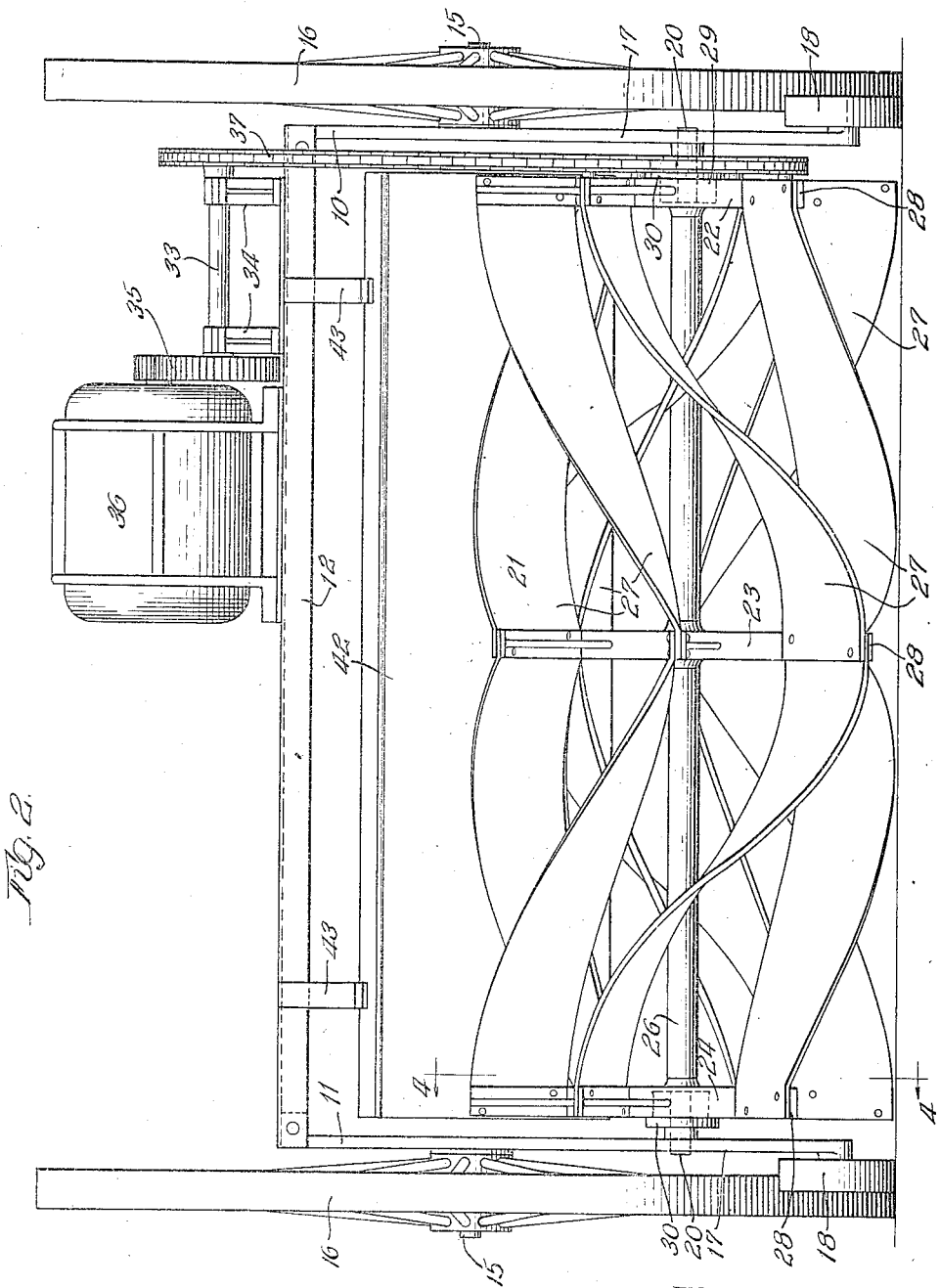

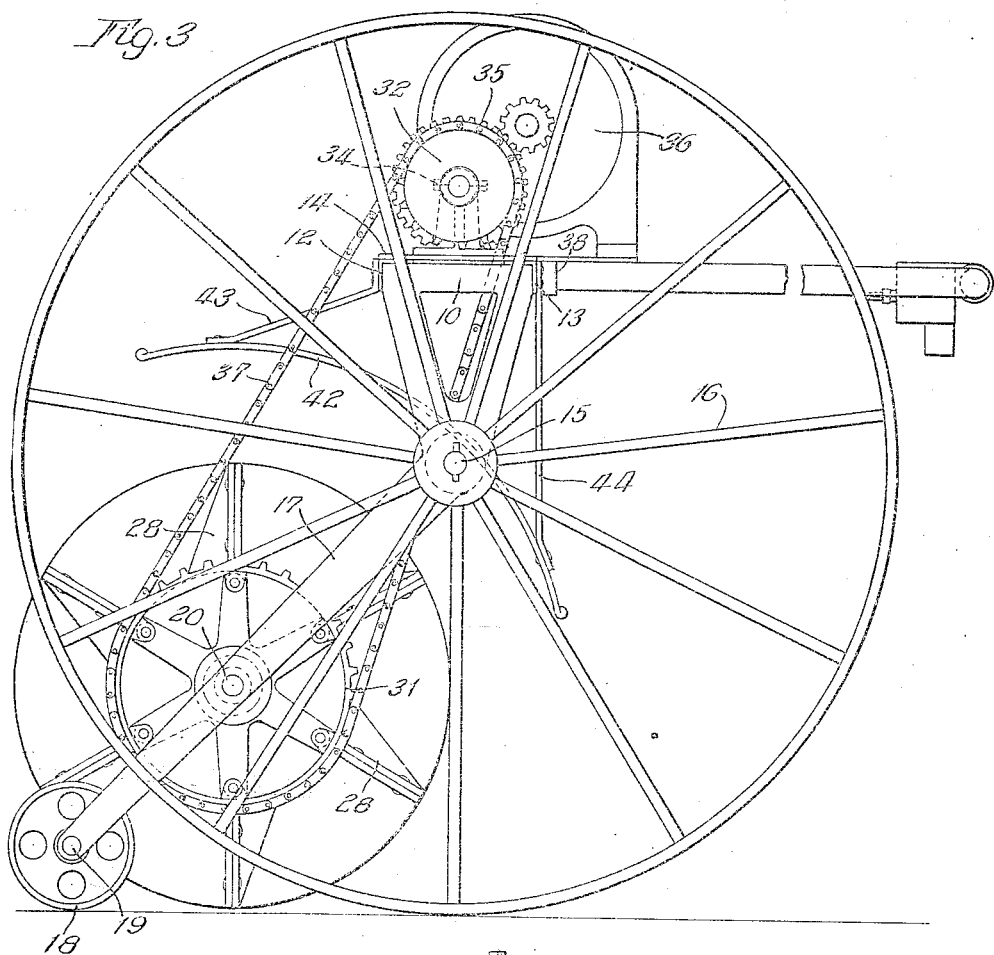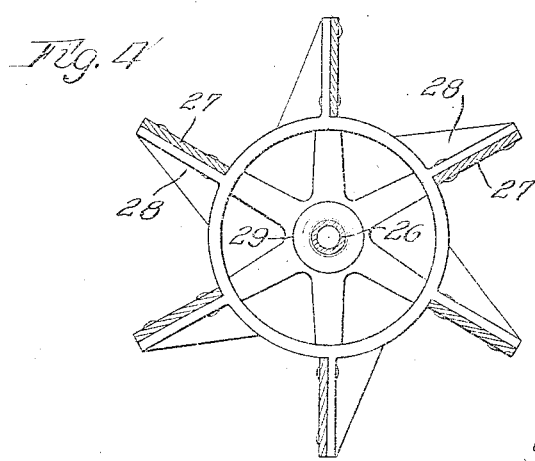

1,443,586

UNITED STATES PATENT OFFICE.

ALBERT NELSON, OF CHICAGO, AND LOUIS R. WONDERLING, OF MAYWOOD, ILLINOIS.

SAND-CUTTING MACHINE.

Application filed January 7, 1922. Serial No. 527,531.

*To all whom it may concern:*

Be it known that we, ALBERT NELSON and LOUIS R. WONDERLING, citizens of the United States, residing at Chicago and Maywood, respectively, in the county of Cook and State of Illinois, have invented certain new and useful Improvements in Sand-Cutting Machines, of which the following is a specification.

This invention relates to sand cutting machines, and has for its principal object to provide a machine that can be economically produced and can be safely and efficiently operated by unskilled labor.

Another object of the invention is to make it possible to balance the machine on two relatively large wheels so that it can be readily moved about the foundry and turned in a small space.

Another object of the invention is to so construct and arrange the wheels and the sand cutter that the machine will work close to a wall.

Further objects of the invention will become apparent as the description is read in connection with the accompanying drawing illustrating a selected embodiment of the invention, and in which Fig. 1 is a plan view of a sand cutting machine, a portion of the handle being broken away;

Fig. 2 is a front elevation of such a machine;

Fig. 3 is a side elevation with a portion of the handle broken away; and

Fig. 4 is a transverse section of the sand cutter on the line 4—4 of Fig. 2.

The frame of the selected embodiment here disclosed includes two side members 10 and 11 which may be castings, forgings or the like, connected at their upper ends by angle irons 12 and 13 upon which is secured a plate 14. The side members 10 and 11 are preferably angular, as indicated in Fig. 3, and are provided at the angles with suitable spindles 15, upon which are journaled the large transporting wheels 16. From the spindles 15 the side frames project downwardly and forwardly in the form of arms 17, which reach beyond the peripheries of the wheels 16. The extreme lower ends of these arms are equipped with relatively small wheels 18 journaled on spindles 19 secured to the arms 17, as will be clear from Figs. 2 and 3. Between the spindles 15 and 19 arms 17 are provided with spindles 20 upon which the sand cutter 21 is journaled. The cutter in the present embodiment is composed of three wheels or spiders 22, 23 and 24 connected at their hub portions by the tubular shafts 25 and 26, and at their peripheries by the sand cutting blades 27. Preferably the wheels are welded to the shaft sections 25 and 26 so as to make the structure strong and rigid, but, of course, they may be connected in any other suitable manner. The sand cutting blades 27, 12 in number—6 on the right side and 6 on the left—are of spiral formation, curving from the central wheel 23 to the side wheels 22 and 24, so that the ends of each blade are substantially a quarter of a turn apart circumferentially of the sand cutter. The blades are connected to the wheels or spiders by suitable brackets 28, and instead of the blades on the left and the right being separate, they may be in one continuous piece extending spirally in one direction to the center, and spirally in opposite direction to the other end. The essential feature of the sand cutter is that the blades be arranged so as to toss the sand from the right towards the left, and from the left towards the right, equally, and leave it in a ridge or windrow behind the machine. The wheels or spiders 22 and 24 are preferably provided with enlarged hub portions 29 for the reception of roller bearings into which the spindles 20 are inserted. Suitable caps 30 equipped with felt washers are screwed onto the hubs and exclude sand and dirt from the bearings.

One end of the sand cutter is equipped with a sprocket wheel 31 here shown as secured to the wheel or spider 22. This sprocket is aligned with a similar sprocket 32 carried by a shaft 33 mounted in the bearings 34 on the plate 14, and driven through gearing 35 from the motor 36. A sprocket chain 37 running about the sprockets 31 and 32 serves to transmit the power of the motor to the sand cutter. We have found this driving mechanism very satisfactory in practice, but it will be understood that any suitable substitute may be used. The motor may be driven either forward or backward, or suitable change speed gearing may be supplied, as will be obvious to those skilled in the art.

The angle iron 13 is equipped with a pair of brackets 38 to which the handle 39 is rigidly secured. This handle is here shown in substantially U-shape, and should be of sufficient length to give proper control of the machine. The power for the motor may be taken from a suitable wall socket and a control switch 40 is conveniently located about the middle of the rear portion 41 of the handle so that it can be operated easily from each side. The wires 40' leading to the motor are conveniently passed through the tubing of which the handle is formed. This insures complete protection for the wires and keeps them entirely out of the operator's way.

The particular location of the motor will be somewhat controlled by the size and location of the sand cutter, since these two elements should be so located that no great force would be required to balance the machine on the spindles 15. With the arrangement illustrated in Fig. 3, comparatively small pressure on the handle 39 will lift the wheels 18 from the floor or ground and permit the machine to be readily turned and maneuvered through small spaces and tortuous passages.

We have shown the sand cutter and the wheels 18 of such diameter and so located with respect to the spindles 15 that they lie entirely within a square of which the horizontal and vertical radii passing through the axis of the spindles 15 are sides. This is a very advantageous arrangement for it permits the sand cutter to be operated close to a wall of the foundry. Preferably the wheels 18 are in such relation to the sand cutter that they will prevent its coming in contact with either the floor or a wall at right angles thereto.

The use of the large wheels 16 makes it possible to readily move the machine over obstructions such as are usually found on the floor of a foundry, but while we prefer that these wheels be of the relative size shown in the drawing, it will be clear that good results can be secured by making these wheels relatively much smaller so that the wheels 18 in the sand cutter 21 project relatively farther beyond the periphery of the wheels 16.

In order to prevent the sand from being scattered and to cause it to fall in a proper windrow after being tossed by the blades 27, we provide the shield or deflector 42 which is preferably curved as indicated in Fig. 3 and projects from a point well over the front of the sand cutter to beyond the rear side thereof, so that the flying sand will strike the curving-under surface of the deflector and be guided thereby to fall behind the machine in a regular windrow. This shield or deflector is conveniently supported by the front braces 43 and the rear braces 44 connected with the angle irons 12 and 13 and the top surface of the shield or deflector, as shown.

We are aware that changes may be made in the form, construction and arrangement of the invention, as set forth in the selected embodiment herein, without departing from the scope or sacrificing any of its material advantages, and we therefore reserve the right to make all such changes as fairly fall within the scope of the following claims.

We claim:

1. In a sand cutting machine, a frame having depending side members, carrying wheels mounted on said side members at their lower ends, arms projecting forwardly and downwardly from the lower ends of said side members and carrying small wheels on their lower ends in advance of the carrying wheels, a sand cutter mounted in said arms between said frame and said small wheels, a handle projecting rearwardly from the upper portion of the frame, a motor geared to said sand cutter for operating the same and mounted on the frame and handle in a position so that slight pressure only upon the handle is required to balance the machine on the carrying wheels and facilitate turning the machine.

2. In a sand cutting machine, a frame, a pair of large transporting wheels on which the frame is mounted, a rearwardly projecting handle by which the frame may be balanced on the transporting wheels, a rotary sand cutter carried by the frame and projecting beyond the periphery of the wheels, and a pair of relatively small wheels on the frame and projecting beyond the periphery of the sand cutter to prevent it from striking the floor.

3. In a sand cutting machine, a frame, a pair of wheels on which the frame is mounted, a rearwardly projecting handle by which the frame may be balanced on said wheels, said frame having downwardly and forwardly extending arms, a rotary sand cutter journalled on said arms and projecting beyond the periphery of said wheels, and means connected with said arms and projecting beyond the periphery of said sand cutter to prevent it from coming into contact with the floor.

4. In a sand cutting machine, a frame, a pair of relatively large wheels on which the frame is mounted, a rotary sand cutter carried by the frame and projecting beyond the periphery of said wheels but lying within a square determined by horizontal and vertical radii of said wheels, and relatively small wheels carried by the frame and projecting beyond the periphery of said sand cutter to prevent it from coming into contact with the floor.

5. In a sand cutting machine, an arched frame, a pair of wheels journaled thereon, a handle projecting rearwardly from said frame, arms extending downwardly and forwardly from said frame, a rotary sand cutter mounted on said arms to rotate about an axis parallel to the axis of said wheels, means carried by the frame for driving said sand cutter, and a pair of relatively small wheels carried by said arms to limit the movement of said frame.

6. In a sand cutting machine, a frame, a pair of spindles carried thereby, wheels journaled on said spindles, a handle extending rearwardly from said frame by which the frame may be rotated on said spindles, a sand cutter mounted on said frame in front of said spindles, and a second pair of wheels adapted to limit the rotation of the frame support to hold the sand cutter clear of the floor.

7. In a sand cutting machine, a frame including spaced side members connected by transverse members, a pair of transporting wheels on which said frame is mounted, a rearwardly extending handle by which said frame may be balanced on said wheels and rotated about their axis, a rotary sand cutter mounted below and in front of the axis of said wheels and projecting beyond their periphery, and a pair of relatively small wheels mounted below and in front of said sand cutter and projecting beyond its periphery.

8. In a sand cutting machine, a frame, a pair of wheels on which the frame is mounted, a rotary sand cutter mounted on the frame at points within the periphery of the wheels and projecting beyond them, and means lying within a square formed below a horizontal radius of said wheels for preventing said cutter from striking the floor.

ALBERT NELSON.
LOUIS R. WONDERLING.